US010691742B2

(12) United States Patent
Cho et al.

(10) Patent No.: US 10,691,742 B2
(45) Date of Patent: Jun. 23, 2020

(54) CONTENTS MANAGEMENT METHOD AND APPARATUS

(71) Applicant: Samsung Electronics Co., Ltd., Suwon-si, Gyeonggi-do (KR)

(72) Inventors: Bonghyun Cho, Suwon-si (KR); Juyun Sung, Yongin-si (KR); Jeeyoung Her, Seoul (KR); Kyunghye Yang, Seoul (KR); Eunyoung Lim, Seoul (KR); Jiyoung Kwahk, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 384 days.

(21) Appl. No.: 15/648,904

(22) Filed: Jul. 13, 2017

(65) Prior Publication Data

US 2017/0308529 A1 Oct. 26, 2017

Related U.S. Application Data

(63) Continuation of application No. 12/554,328, filed on Sep. 4, 2009, now Pat. No. 9,710,471.

(30) Foreign Application Priority Data

Sep. 25, 2008 (KR) ........................ 10-2008-0094341

(51) Int. Cl.
*G06F 16/48* (2019.01)
*G06F 3/0486* (2013.01)
*G06F 3/0488* (2013.01)

(52) U.S. Cl.
CPC ............ *G06F 16/48* (2019.01); *G06F 3/0486* (2013.01); *G06F 3/04883* (2013.01)

(58) Field of Classification Search
CPC .............................. G06F 16/48; G06F 3/0486
See application file for complete search history.

(56) References Cited

U.S. PATENT DOCUMENTS

| 5,801,699 | A | * | 9/1998 | Hocker | ............... | G06F 3/04817 715/837 |
| 5,886,698 | A | * | 3/1999 | Sciammarella | ....... | G06F 3/0486 715/769 |
| 5,963,191 | A | * | 10/1999 | Jaaskelainen, Jr. | ... | G06F 3/0481 715/856 |
| 8,266,550 | B1 | | 9/2012 | Cleron et al. | | |
| 2005/0183040 | A1 | * | 8/2005 | Kondo | .................. | G06F 1/1616 715/841 |
| 2006/0072028 | A1 | | 4/2006 | Hong | | |

(Continued)

FOREIGN PATENT DOCUMENTS

KR 10-2006-0125468 A 12/2006

*Primary Examiner* — Jensen Hu
(74) *Attorney, Agent, or Firm* — Jefferson IP Law, LLP

(57) ABSTRACT

A content management method and apparatus is provided for conveniently and efficiently classifying and filtering contents stored in at least one digital device. A contents management method may include displaying, when a digital device is connected, graphical user interface (GUI) objects representing the digital devices and contents stored in the digital devices, and setting keywords for classifying the contents in response to events triggered by user behaviors in association with at least one of the GUI objects. The method may also include displaying the GUI objects representative of the contents classified by using the keywords.

19 Claims, 15 Drawing Sheets

(56) References Cited

U.S. PATENT DOCUMENTS

| | | |
|---|---|---|
| 2006/0132455 A1 | 6/2006 | Rimas-Ribikauskas et al. |
| 2006/0279554 A1 | 12/2006 | Shin et al. |
| 2007/0046649 A1 | 3/2007 | Reiner |
| 2007/0106661 A1* | 5/2007 | Narita .................. G06F 16/338 |
| 2007/0156783 A1* | 7/2007 | Zbogar-Smith ......... G06F 16/93 |
| 2007/0271524 A1 | 11/2007 | Chiu et al. |
| 2007/0282908 A1 | 12/2007 | Van Der Meulen et al. |
| 2008/0195863 A1 | 8/2008 | Kennedy |
| 2008/0281851 A1 | 11/2008 | Izadi et al. |
| 2008/0288869 A1 | 11/2008 | Ubillos |
| 2009/0164489 A1 | 6/2009 | Matsuda et al. |
| 2009/0198359 A1 | 8/2009 | Chaudhri |
| 2009/0307623 A1* | 12/2009 | Agarawala .......... G06F 3/04815 715/765 |
| 2010/0053408 A1 | 3/2010 | Ozawa et al. |
| 2010/0221012 A1 | 9/2010 | Awaji |
| 2010/0318558 A1 | 12/2010 | Boothroyd |

\* cited by examiner

FIG. 4C
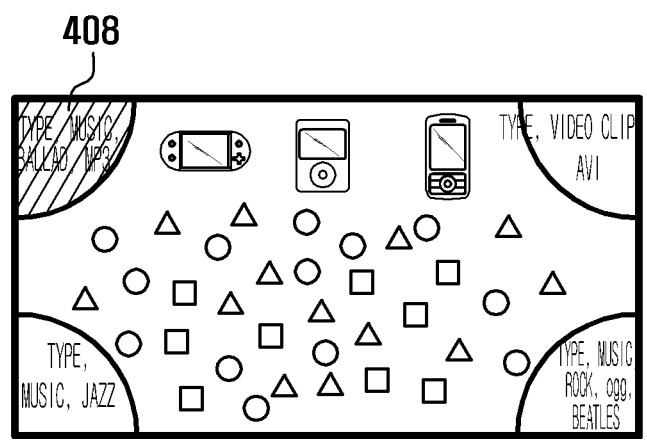
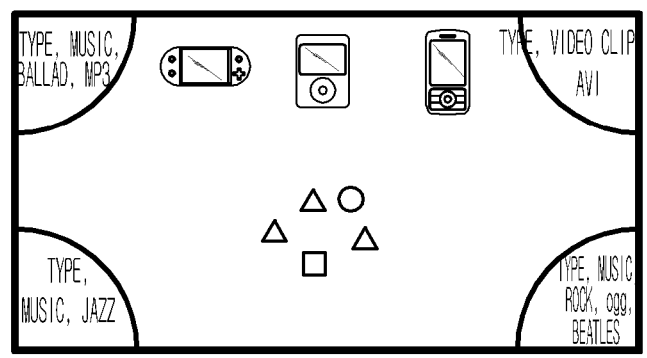

FIG. 6A
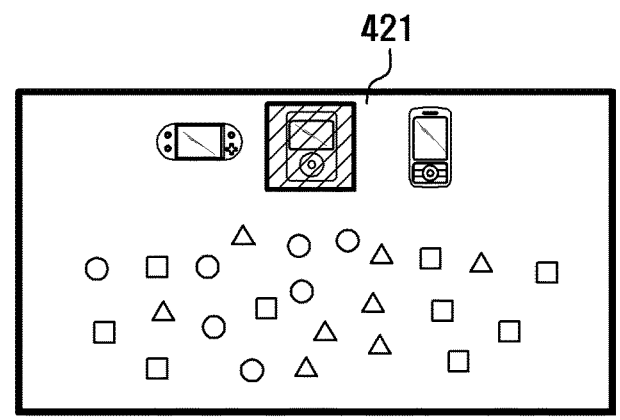
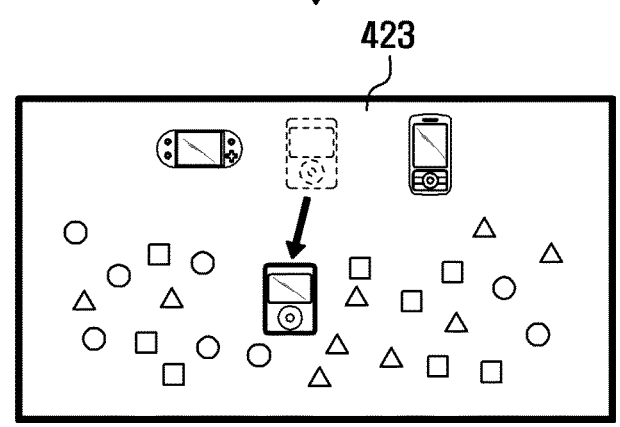
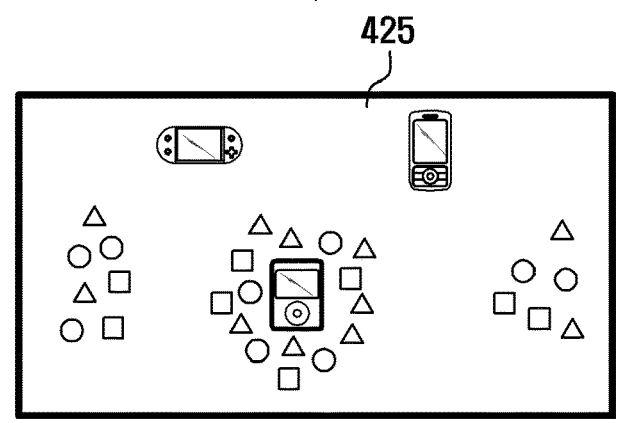

FIG. 6D
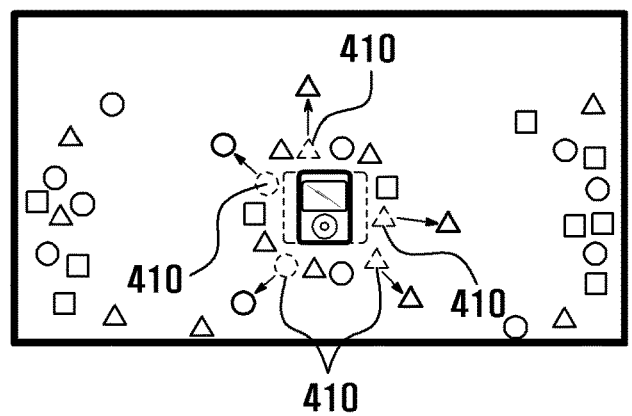
FIG. 6E
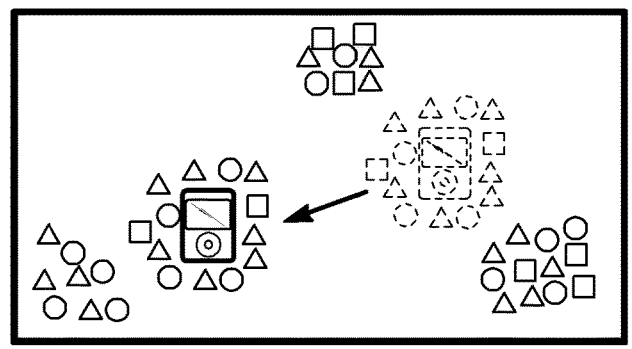
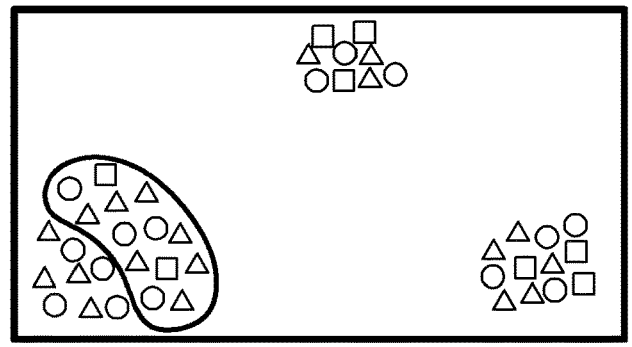

FIG. 8A

| | | | |
|---|---|---|---|
| CLAZZIQUAI 3ᴿᴰ | ♪ | ARTIST, ALBUM, ELECTRONICA | |
| DO YOU LIKE SPRING BEAR? | ♪ | ROLLERCOASTER, ELECTRONICA | 503 |
| Romeo and Juliet | ♪ | CLAZZIQUAI, 3ᴿᴰ, ELECTRONICA | |
| LORD OF THE RING | 🎬 | MOVIE, PETER JACKSON, FANTASY | |
| HABIT | ♪ | ROLLERCOASTER, ELECTRONICA | |
| ROLLERCOASTER | 👤 | AMUSEMENT PARK, BIRTHDAY, FRIEND | |
| ⋮ | | ⋮   500 | |

| | |
|---|---|
| CLAZZIQUAI 3ᴿᴰ | ♪ |
| DO YOU LIKE SPRING BEAR? | ♪ |
| Romeo and Juliet | ♪ |
| HABIT | ♪ |
| ROLLERCOASTER OST | ♪ |
| WONDERWOMAN | ♪ |

| | | |
|---|---|---|
| CLAZZIQUAI 3ᴿᴰ | ♪ | ARTIST, ALBUM, ELECTRONICA |
| DO YOU LIKE SPRING BEAR? | ♪ | ROLLERCOASTER, ELECTRONICA |
| Romeo and Juliet | ♪ | CLAZZIQUAI, 3ᴿᴰ, ELECTRONICA |
| HABIT | ♪ | ROLLERCOASTER, ELECTRONICA |
| ROLLERCOASTER OST | ♪ | ROLLERCOASTER, ELECTRONICA |
| WONDERWOMAN | ♪ | ELECTRONICA, 3ᴿᴰ |

CONTENTS MANAGEMENT METHOD AND APPARATUS

CROSS REFERENCE TO RELATED APPLICATION(S)

This application is a continuation application of prior application Ser. No. 12/554,328, filed on Sep. 4, 2009, which claimed the benefit under 35 U.S.C § 119(a) of a Korean patent application filed on Sep. 25, 2008 in the Korean Intellectual Property Office and assigned Serial number 10-2008-0094341, the entire disclosure of which is hereby incorporated by reference.

BACKGROUND OF THE INVENTION

Field of the Invention

Exemplary embodiments of the present invention relate to digital content management and, in particular, to a content management method and apparatus for conveniently and efficiently classifying and filtering contents stored in at least one digital device.

Description of Background

With the widespread use of portable devices, such as MP3 players, digital cameras, and Play Station Portables (PSP), multiple portable devices may be owned by a single consumer. One of the difficulties when using multiple portable devices is efficient management of the device-specific contents. There is, therefore, a need to use a Media Docking Station (MDS) which may provide a multi-device interface to manage (e.g., to move, store, search, classify, and sort) the contents stored in the multiple devices integrally and efficiently.

In addition, as the capacity of storage media (e.g., hard disk and flash memory) increases, information processing devices have also been developed to store and process large amounts of digital content. Such storage media are continuously being reduced in size to be adopted to portable devices, such as the MP3, Portable Multimedia Player (PMP), and mobile phone. Furthermore, advancements in data compression technology have increased the storage capacity of the portable devices. However, as the number of digital devices that are owned by a person/consumer and the amount of content stored in each digital device increases, managing the digital contents of the digital devices has become complex and inconvenient.

SUMMARY OF THE INVENTION

Exemplary embodiments of the present invention provide a contents management method, and an apparatus that classifies and filters the contents stored in multiple digital devices.

Additional features of the invention will be set forth in the description which follows, and in part will be apparent from the description, or may be learned by practice of the invention.

Exemplary embodiments of the present invention disclose a contents management method for a media management apparatus. The method includes displaying graphical user interface objects corresponding to a connected digital device and to contents stored in the digital device. The digital device is connected to the media management apparatus. The method further includes determining keywords to classify and filter the stored contents in response to an event triggered by user behavior in association with at least one of the graphical user interface objects, and displaying the graphical user interface objects corresponding to the classified and filtered contents.

Exemplary embodiments of the present invention also disclose a contents management apparatus. The contents management apparatus includes an interface unit, a touch screen, and a control unit. The interface unit connects to at least one digital device. The touch screen displays graphical user interface objects corresponding to the at least one digital device and to contents stored in the at least one digital device. The control unit classifies and filters the stored contents in response to an event triggered by a user behavior detected on the touch screen. The events include a selection of a keyword region, a selection and drag of the at least one digital device or the graphical user interface object corresponding to the digital device, a movement of a search object, and an extraction of common metadata.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

FIGS. 4A, 4B and 4C are diagrams illustrating steps of the content classification process of FIG. 3 according to exemplary embodiments of the present invention;

FIGS. 6A, 6B, 6C, 6D and 6E are diagrams illustrating steps of the content classification process of FIG. 5 according to exemplary embodiments of the present invention;

FIGS. 8A, 8B, 8C and 8D are diagrams illustrating steps of the content classification process of FIG. 7 according to exemplary embodiments of the present invention;

DETAILED DESCRIPTION OF ILLUSTRATED EMBODIMENTS

Figure 1:
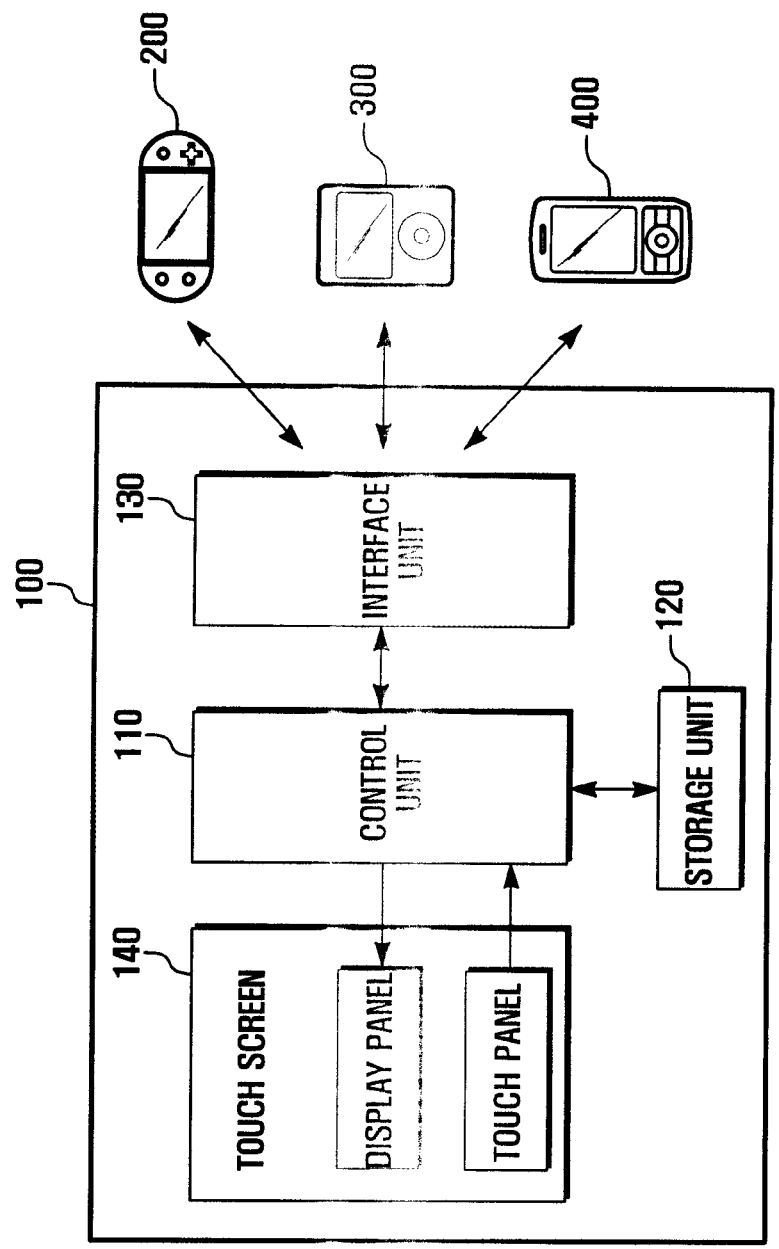
FIG. 1 is a schematic block diagram illustrating a configuration of an MDS for managing contents stored in multiple digital devices according to exemplary embodiments of the present invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements. Detailed descriptions of well-known functions and structures incorporated herein may be omitted to avoid obscuring the subject matter of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be understood that when an element is referred to as being "on", "connected to" or "coupled to" another element, it can be directly on, connected or coupled to the other element or intervening elements. In contrast, when an element is referred to as being "directly on," "directly connected to" or "directly coupled to" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Prior to explaining exemplary embodiments of the present invention, relevant terminology will be defined for the description below.

"Metadata" may refer to data related to content providing attribute information, such as a file name, a file size, and/or a creation time. For instance, an MP3 file can be stored with the metadata such as title, composer, artist, and/or genre related to the content of the MP3 file.

"Media Docking Station" (MDS) may refer to a terminal providing multi-device interface for a user of the MDS to connect multiple digital devices thereto, and to integrally manage the contents stored in the multiple digital devices. The MDS can be a mobile terminal, a laptop computer, a PDA, or in general, any suitable multi-device interface. The MDS can be implemented in the form of a television (TV), a High Definition TV (HDTV), a Personal Computer (PC) having a large display screen, and/or a Large Format Display (LFD). The MDS may be configured to allow vertical connection of multiple display devices, or a table top display allowing parallel (e.g., horizontal) connection of multiple display devices. The MDS may be implemented using a display panel supporting touch screen functionality. The MDS may be called media management apparatus.

"Keyword" may refer to a word that is used for classifying a plurality of contents and can be set according to an event generated by user manipulation. For instance, the keyword can be set by mapping to a keyword region. The keyword may also be set by a device type of digital devices, a supportable file format, or attribute information of the contents. The keyword can be entered as a search object and/or as a common metadata shared by multiple contents.

Hereinafter, exemplary embodiments of the present invention are described in detail with reference to the accompanying drawings.

FIG. 1 is a schematic block diagram illustrating a configuration of an MDS for managing contents stored in multiple digital devices according to exemplary embodiments of the present invention.

As shown in FIG. 1, the MDS 100 may include a control unit 110, a storage unit 120, an interface unit 130, and a touch screen 140.

The interface unit 130 may provide a plurality of cable and radio interfaces for connecting portable digital devices 200, 300, and 400 to the MDS 100 through wired and/or wireless links such that the MDS 100 can discriminate and manage the contents stored in the digital devices 200, 300, 400 integrally. The touch screen 140 of the MDS 100 may provide the user with an intuitive input/output interface for managing the contents stored in the digital devices 200, 300, and 400. The MDS 100 can access an Internet server to download various contents from the Internet server, and can upload the downloaded contents to the multiple digital devices 200, 300, and 400. The MDS 100 can further include a communication unit (e.g., wired or wireless local area network (LAN) card) to access the Internet server. The MDS 100 can also be configured to access the Internet server by means of one of the digital devices 200, 300, 400 that supports Internet access and can connect to the Internet server.

The structures and functions of the internal function blocks of the MDS 100 are described hereinafter in more detail.

The interface unit 130 may be a connection module for supporting connection of the digital devices 200, 300, and 400 to the MDS 100. The interface unit 130 may provide communication channels between the MDS 100 and the digital devices 200, 300, and 400. Each of the digital devices 200, 300, and 400 can be a PDA, a PSP, a PMP, an MP3 player, a digital camera, or, in general, any portable multimedia and/or telecommunication device. The interface unit 130 can include various connection interfaces to provide connections to various digital devices. For instance, each of the digital devices 200, 300, and 400 can be connected to using at least one of a Universal Serial Bus (USB) interface, a Universal Asynchronous Receiver/Transmitter (UART) interface, and a Peripheral Component Interconnect (PCI) interface provided in the interface unit 130. Although the MDS 100, as shown in FIG. 1, includes a single interface unit 130, multiple interface units can be included in the MDS 100, or the interface unit 130 can include multiple connection interfaces. If the digital devices 200, 300, and 400 support short range radio communication standard interfaces, such as, for example, Bluetooth® and Zigbee® interfaces, the interface unit 130 can further include a corresponding short range radio communication standard interface.

The touch screen 140 can include a display panel and a touch panel assembled, in some cases, on the display panel. The display panel may display various menus, user data input by the user, operation status, and various other functions and information indicators. The display panel can display the contents stored in the multiple digital devices 200, 300, and 400. Each content can be displayed in the form of a representative image, such as a Graphical User Interface (GUI) object (e.g., icon). The display panel can also be configured to display the contents as classified by a keyword set according to an event triggered by a behavior of the user (hereinafter called user behavior event). The display panel can also display the icons (hereinafter called digital device icons) representing the digital devices connected to the MDS 100. The digital device icons may be displayed on one side of the screen of the display panel (e.g., top side of the display panel), or, in general, in any suitable location on the display panel. The display panel can be implemented by a Liquid Crystal Display (LCD) panel or an Organic Light Emitting Diode (OLED) panel.

The touch panel may be a touch sensitive device assembled on the display panel for sensing various types of touches including, for example, a tap, drag, double touch, and/or multi touch, and can be implemented with various types of touch sensors, such as, for example, a capacitive touch sensor, resistive touch sensor, and/or optical touch sensor. The touch panel can also sense a strength of a touch.

Multi touch may refer to a touch event contacting multiple points simultaneously. Multi touch may be used to enter multiple keywords for classifying contents. For example, when multiple touches are detected on the touch panel at positions where keywords are presented by means of the display panel, the touch panel may output a corresponding touch signal to the control unit 110 such that the control unit 110 may check the metadata of the contents, and may classify and/or filter the contents by the keywords mapped to the positions where the multiple touches are detected.

The strength of a touch may refer to a pressure level detected at a position where the user touches the touch panel. The number of contents displayed in response to a touch event can be configured differently according to the touch strength. The storage unit 120 may store reference touch strengths and numbers of contents to be displayed corresponding to the respective reference touch strengths.

The storage unit 120 can include a program region and a data region. The storage unit 120 can also store an application program related to the operations of the MDS 100 and user data.

The program region may store an Operating System for controlling operations of the MDS 100. The program region may also store application programs for identifying the digital devices 200, 300, and 400 connected to the MDS 100, and the contents stored in the individual digital devices 200, 300, and 400. The program region can store other application programs, such as, for example, audio contents playback program, video contents playback program, document viewer program, game content playback program, and image view program.

The data region may store application data generated while the MDS 100 is operating. The data region can store keyword map information including, but not limited to, mappings for displaying the keywords on the display panel and digital device icons representing the connected digital devices. The data region can also store numbers of contents that are determined according to the touch strength levels.

A history log may include data containing the keywords used to classify the contents, as well as specific information such as usage time, date, and weather. The keywords can be stored in the form of a search formula for the user to classify the contents conveniently. For instance, when the user is playing a game of "Tetris" during a specific time, the keywords related to the game "Tetris" may include "game" and "Tetris," and may be stored, under the control of the control unit 110, in the storage unit 120 together with the specific time (e.g., playing time). If a content classification command signal is input at the corresponding time, the control unit 110 may instruct the display panel to display the keywords "game" and "Tetris" and the specific time on a side of the display panel.

The frequency of use (i.e., usage frequency) of the each content may be accumulated and stored in the data region. The usage frequencies of the contents can be used to determine priorities of the contents.

The control unit 110 may control the operations of the MDS 100 including, signaling among the internal function blocks of the MDS 100, and processing the contents. The control unit 110 may receive digital device information (including device type and supportable file formats) from the digital devices 200, 300, and 400 connected to the MDS 100, digital contents, and metadata of the digital contents stored in the digital devices 200, 300, and 400. Subsequently, the control unit 110 can instruct the display panel to display contents stored in the digital devices 200, 300, and 400 connected to the MDS 100 and digital device icons on a side of the display panel.

When a touch is detected on a keyword region, the control unit 110 may calculate a strength of the touch and may instruct the display panel to display a number of content items corresponding to the touch strength level. For example, once the touch is detected at one of the keyword regions on the touch panel, the control unit 110 may check the touch strength and the keyword mapped to the keyword region, and may then retrieve the contents of the metadata including the keyword. Next, the control unit 110 may instruct the display panel to display the content items representing the contents. The number of content items displayed will correspond to the touch strength. For instance, up to ten content items may be displayed for a touch strength of 1, and up to 30 content items may be displayed for a touch strength 2. In general, the greater the touch strength, the greater the number of content items displayed, or the weaker the touch strength, the smaller the number of content items displayed.

The control unit 110 may classify the contents in response to digital device selection and/or detection of drag events. For example, when a digital device icon is dragged in a direction (e.g., towards a center of the display panel) by means of a drag touch event, the control unit 110 may configure the keywords corresponding to the device types of the dragged digital device icon and file formats supported by the dragged digital device icon, and may classify the contents of the metadata that include the configured keywords. The control unit 110 can receive device information, such as the device type of the connected digital devices 200, 300, and 400, and file formats supported by the connected digital devices 200, 300, and 400. The control unit 110 can classify the contents by means of a search object. A search object can be a physical object provided in the form of an accessory of a mobile terminal, or a GUI object, such as a digital device icon. A keyword can be entered through a text window provided by the GUI object or by means of an additional input of the physical object. Once the physical object is placed on the touch screen 140, or the GUI object is activated, the control unit 110 can check the stored keywords. When the search object is dragged/moved to pass by representative images (e.g., icons) of the contents on the display panel, representative images corresponding to the contents having meta data including the keyword, or related keywords, may stick or become attached to the search object. The control unit 110 can also check priorities of the contents attached to the search object, and may separate the contents having low priorities. The control unit 110 may check the priorities in response to a user's behavior of moving the search object up and down or left and right.

The control unit 110 may also extract common metadata shared by multiple contents. The common metadata may be selected by the user from the contents received from the connected digital devices 200, 300, and 400. The control unit 110 may set the common metadata as keywords, and may classify the contents having the keywords in their metadata. Some of the classified contents may be displayed on the display panel so that the user may select at least one of the displayed contents. If at least one of the displayed contents is selected by the user, the control unit 110 may calculate the number of selected contents and a ratio of the selected contents to the displayed contents. If the selected content to displayed contents ratio is equal to or greater than a predetermined threshold value, the control unit 110 may determine that the classification result on the contents is reliable, and may then display all the classified contents. If the selected content to displayed contents ratio is less than the predetermined threshold value, the control unit 110 may check the metadata of the selected contents to extract a new common metadata, and may classify contents with the keywords including the newly extracted common metadata again. The keyword-based content classification process is described in further detail below with reference to FIG. 7, FIG. 8A, FIG. 8B, and FIG. 8C.

When a digital device 200, 300, and 400 contacts the touch screen 140 of the MDS 100, the control unit 110 can recognize the digital device 200, 300, and 400 and may display the contents stored in the connected digital device 200, 300, and 400. The touch screen 140, under control of the control unit 110, may display an area around the contact point of the digital device 200, 300, and 400 and the contents stored within the digital device 200, 300, and 400 in an identical color. Accordingly, the user may intuitively identify digital devices 200, 300, and 400 and corresponding contents stored therein when multiple digital devices 200, 300, and 400 are contacting the touch screen 140. If a digital device 200, 300, and 400 is dragged in an upward, downward, leftward or rightward direction on the touch screen 140, the control unit 110 may arrange the contents according to the preset arrangement setting in response to the drag direction. The control unit 110 can also display contents having similar attributes in close proximity to one another. For example, contents having metadata such as genre, location, title, and creation date that are similar to each other may be displayed in an overlapped manner, and in some cases, may be displayed as one content. The display of contents having similar attributes is described in further detail below with reference to FIG. 10D and FIG. 10E. The control unit 110 can instruct the display panel to display a guide object for indicating the arrangement criteria set for the drag directions. If the user selects one of the guides and draws a circle in clockwise direction or a counterclockwise direction on the touch screen 140, the control unit 110 may change the arrangement pattern for the selected guide.

If the MDS 100 includes an approach sensor and/or photo sensor, the control unit 100 can monitor the approach and retreat of a digital device 200, 300, and 400 using the approach sensor or the photo sensor. When an approach event is detected, the control unit 110 can arrange the contents distributed on the touch screen 140 in an overlapped manner in order of priority. The MDS 100 may also include a sensor to detect a contact of a digital device 200, 300, and 400 with the MDS 100. In general, any suitable detector may be used to detect the contact of the digital device 200, 300, and 400 with the MDS 100.

Although not shown in the drawing, the MDS 100 can further include a camera module, a charging terminal, an input unit, and other supplementary function blocks. It should be understood that the MDS 100 may include various other components, and combinations thereof, and that exemplary embodiments of the present invention are not limited to the components described above.

A contents management method of the above-described MDS 100 is described hereinafter in detail.

Figure 2:
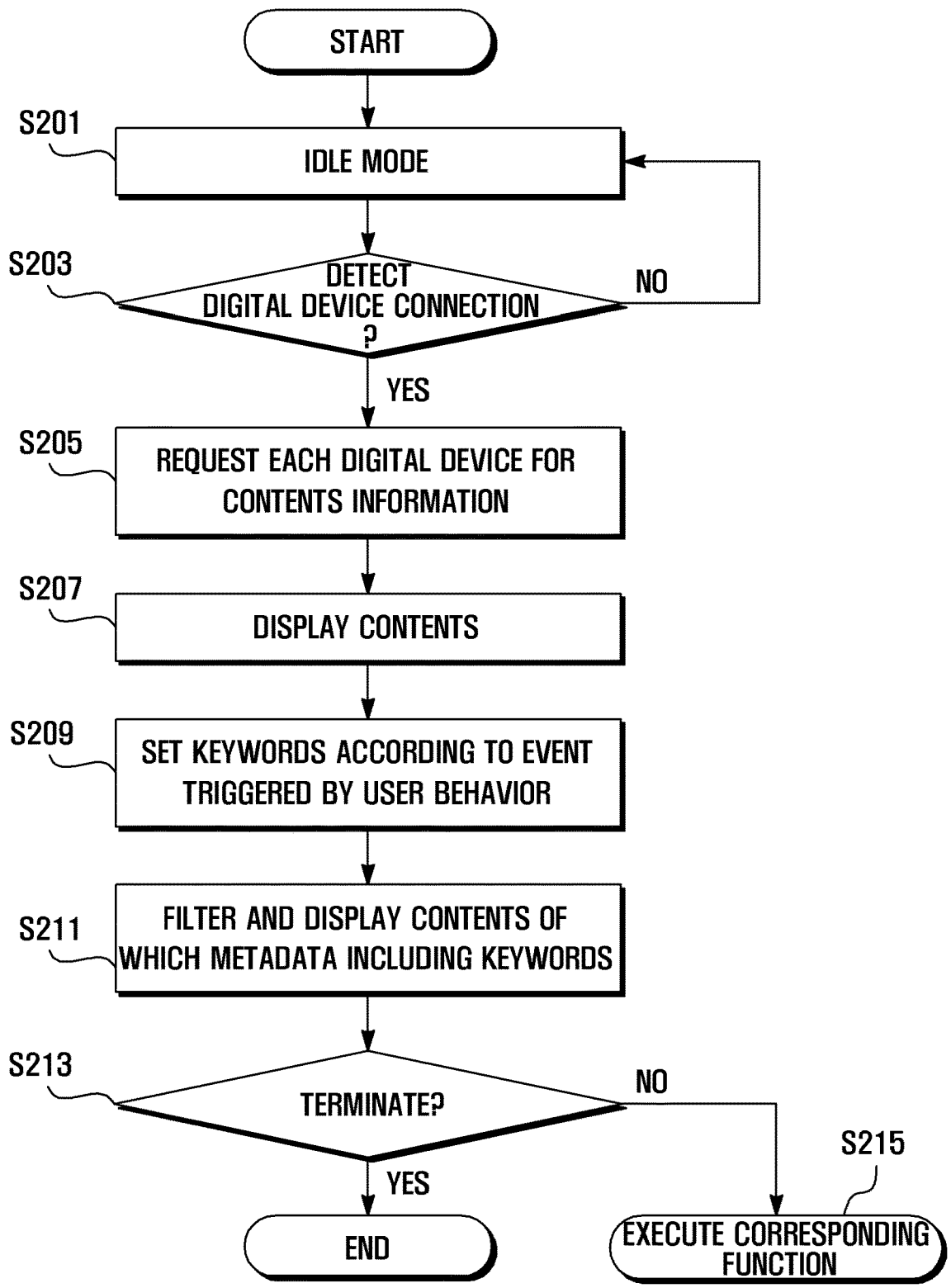
FIG. 2 is a flowchart illustrating a content management method for a MDS according to exemplary embodiments of the present invention.

FIG. 2 is a flowchart illustrating a content management method for a MDS 100 according to exemplary embodiments of the present invention.

Referring to FIG. 2, the MDS 100 may be powered and may begin operating in an idle mode (S201). While operating in an idle mode, the MDS 100 may monitor a connection of a digital device (S203).

Until a connection of a digital device is detected (i.e., no digital device is connected), the MDS 100 may maintain the idle mode and execute the functions in response to user command input. For instance, the MDS 100 can access an Internet server to download contents in response to a series of user commands. If at least one digital device is detected at step S203, the MDS 100 may request each of the at least one connected digital device to send content information (including contents and/or metadata of the contents) and device information (S205).

Once the content information is received completely, the MDS 100 may display the icons corresponding to the received contents and devices on the display panel (S207). The display panel can be composed of a content display zone for displaying the received contents, and a device display zone for displaying the digital device icons. Each content can be displayed as a GUI object (e.g., a particle, icon). The contents displayed as GUI objects can be displayed in different color, size, and shape according to, for example, a file format (e.g., hwp, doc, ppt), a creation date, and a capacity.

The MDS 100 may then set the keywords for classifying the contents in response to user commands input by means of a behavior event conducted by the user (S209). The behavior event may be converted into input signals. The behavior events may include at least one of tapping for selecting an object (e.g., a digital device icon, a search object), dragging or moving the selected object, and other behavior events for extracting common metadata that may be conducted on the touch screen 140. The behavior events are described in further detail below.

After setting the keywords, the MDS 100 may filter and classify the contents having metadata that include the keywords, and may display the classified contents on the display panel (S211).

The MDS 100 may continue to monitor detecting a user command input and, if detected, may determine whether the user command is a process termination command (S213). If the user command is not the process termination command, the MDS 100 may execute a function in response to the user command (S215). For instance, if the user drags specific contents and drops the contents on a specific digital device icon, the MDS 100 may load the contents in the digital device corresponding to the specific digital device icon. If the user command is a contents management termination command, the MDS 100 may terminate the contents management procedure to release the connection with the digital devices.

Several contents classification process of the contents management method of FIG. 2 are described hereinafter in more detail.

Figure 3:
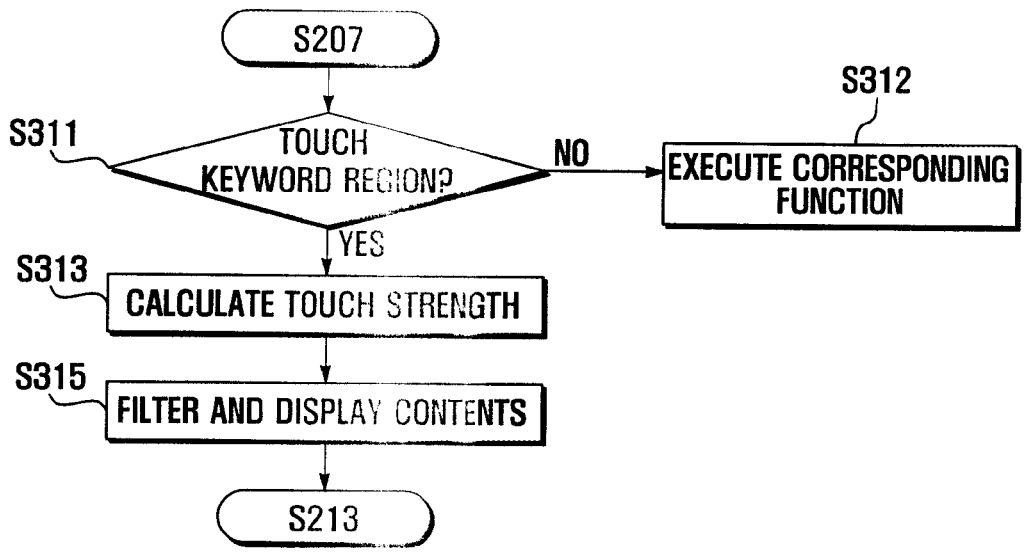
FIG. 3 is a flowchart illustrating a contents classification process of the contents management method of FIG. 2 according to exemplary embodiments of the present invention.
Figure 4A:
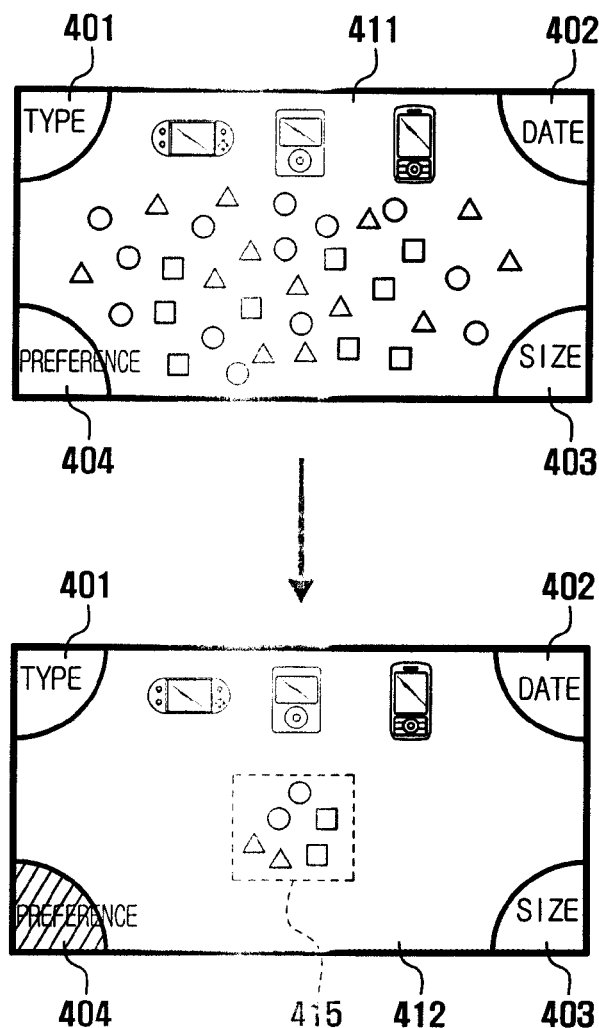
Figure 4B:
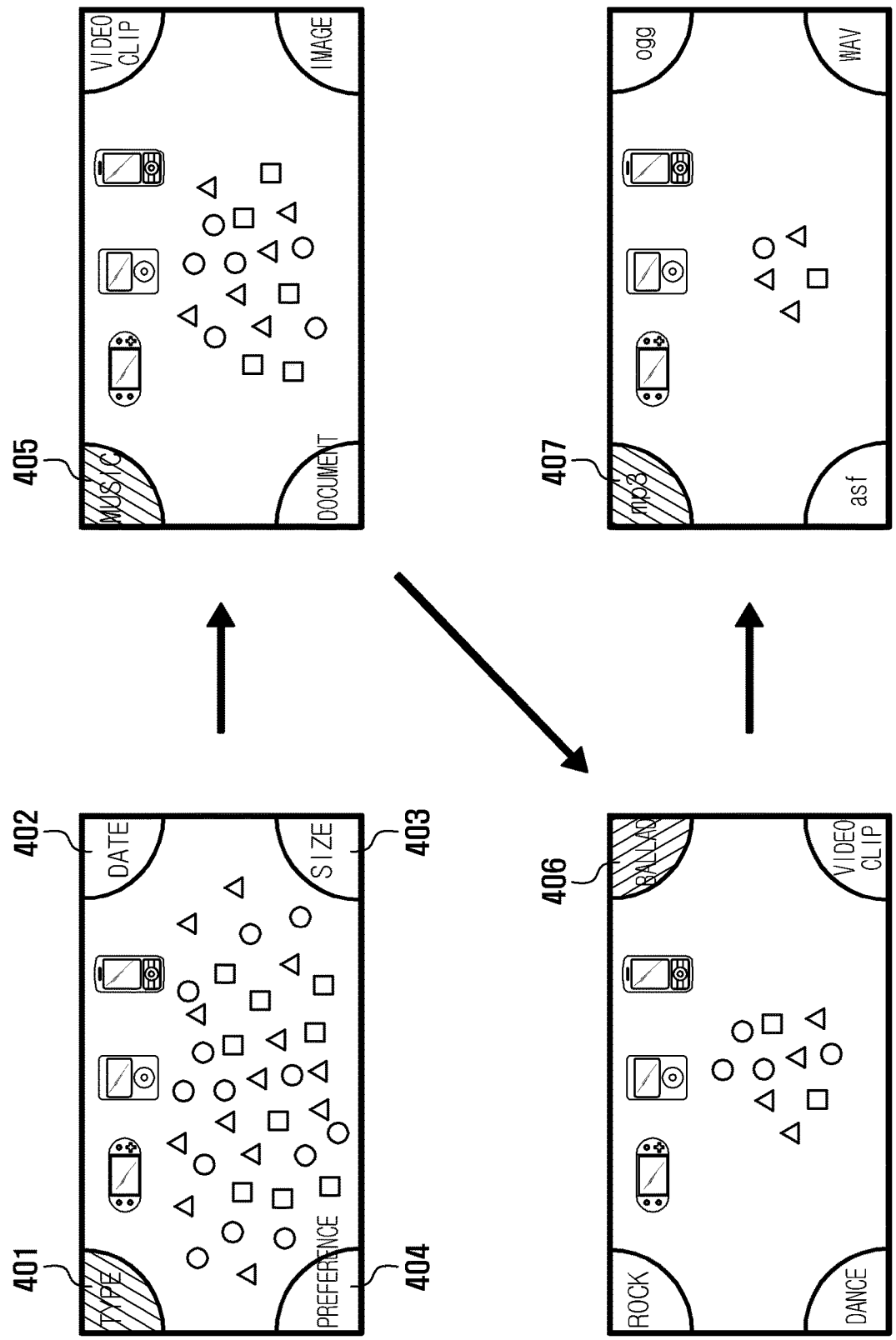

FIG. 3 is a flowchart illustrating a contents classification process of the contents management method of FIG. 2 according to exemplary embodiments. FIG. 4A, FIG. 4B, and FIG. 4C are diagrams illustrating the steps of content classification process of FIG. 3.

Referring to FIG. 3, FIG. 4A, FIG. 4B, and FIG. 4C, the MDS 100 may display a contents management application screen 411 on which the icons of the connected digital devices and/or GUI elements (e.g., particles or icons) representing contents stored in the connected digital devices are arranged, as shown in FIG. 4A. The MDS 100 may display keyword regions 401, 402, 403, and 404 to which the corresponding keywords are mapped at predetermined positions of the contents management application screen 411. The predetermined positions may be set by the user or MDS designer/manufacturer. For example, the MDS 100 can be configured to display the keyword regions 401, 402, 403, and 404 in response to a keyword region request command input by the user. Referring to FIG. 4A, the keyword regions 401, 402, 403, and 404 may include a "type" keyword region 401 for classifying the contents by content type, a "date" keyword region 402 for classifying the contents by date, a "size" keyword region 403 for classifying the contents by size, and a "preference" keyword region 404 for classifying the contents by usage frequency. The MDS 100 may refer to the history log stored in the storage unit 120 and can set keyword regions with the most recently used keywords or most frequently used keywords. The MDS 100 may store the keywords used after the classification of the contents in an accumulated manner. For example, when the "type" keyword region 401, "music" keyword region 405, "ballad" keyword region 406, and "MP3" keyword region 407 are touched in series (in a series of displayed menus) as shown in FIG. 4B, the MDS 100 may store the keywords "type," "music," "ballad," and "MP3" in addition to the date and/or day information (including time). The MDS 100 may then later display the keywords accumulatively stored in association with the history log at the keyword regions such that the user can classify or filter the contents with a reduced number of steps. For instance, in the case that keywords "type," "music," "ballad," and "MP3" are stored in association with the commute time (e.g., 8:00 AM~9:00 AM), and the user requests displaying the keyword regions during the commute time, the MDS 100 may refer to the history log and may display the keyword region 408 mapped to the keywords "type," "music," "ballad," and "MP3," as shown in FIG. 4C. Accordingly, the user can classify or filter the contents by touching the shortcut keyword region with a single step rather than 4 steps of touching "type," "music," "ballad," and "MP3" in series. The MDS 100 can return to the initial content management screen 411 for classifying the contents by type, date, size, and preference using a preset shortcut key (e.g., cancel key).

Although the keyword regions are depicted at the corners of the contents management application screen 411 in FIG. 4A, FIG. 4B, and FIG. 4C, exemplary embodiments of the present invention are not limited thereto. For instance, the keyword regions can be defined at various positions inside the contents management application screen 411 according to the user or designer's preference/selection. Also, the number of the keyword regions can be changed according to the user or designer's preference/selection.

The MDS 100 may monitor the touch screen 140 to detect a touch, and, if any touch is detected, may determine whether a touch is detected at one of the keyword regions (S311). If the touch is not detected at one of the keyword regions, the MDS 100 may execute a function corresponding to the touch event (S312). If a touch is detected at one of the keyword regions, the MDS 100 may measure a strength of the touch (S313). The touch screen 140 can sense the strength of the touch thereon. In some cases, the touch screen 140 can recognize a multi-touch. Multiple keywords for classifying the contents may be entered by touching multiple keyword regions, simultaneously.

Next, the MDS 100 may classify and/or filter the contents of metadata that include the keyword mapped to the keyword region touched by the user, and may display the filtered contents. The number of filtered contents displayed may be based on the strength of the touch (S315). Referring to FIG. 4A, if a touch is detected on the keyword region 404 mapped to the keyword "preference," the MDS 100 may refer to the history log to filter the contents that are mostly frequently used, and may display the filtered contents. The number of displayed filtered contents would be proportional to the strength of the touch at the center of the contents management application screen 412.

Although the contents management application screen 412 of FIG. 4A shows the filtered contents 415, exemplary embodiments of the present invention are not limited thereto. For instance, the MDS 100 can display the filtered contents at the center of the contents management application screen 412 while displaying the rest of the contents at a side of the contents management application screen 411 at a predetermined distance.

Figure 5:
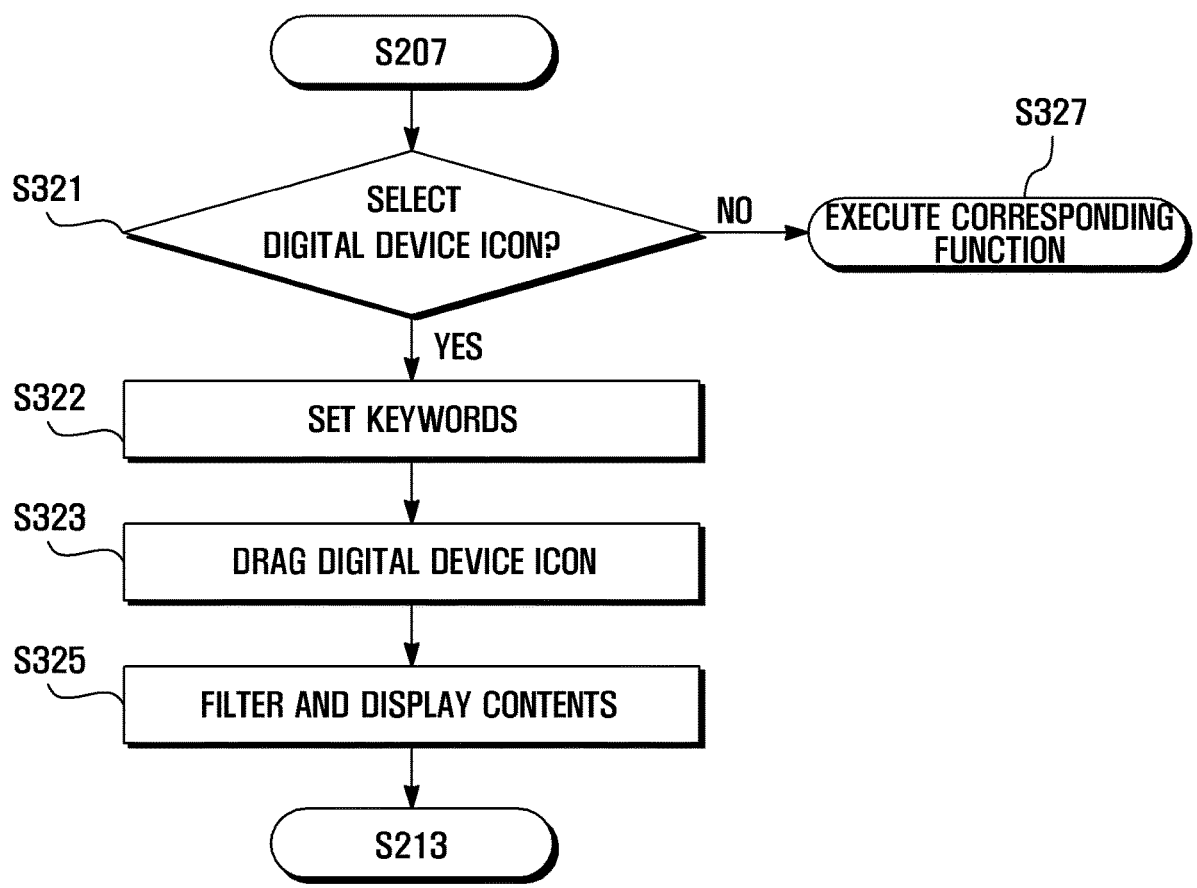
FIG. 5 is a flowchart illustrating a contents classification process of the contents management method of FIG. 2 according to exemplary embodiments of the present invention.

FIG. 5 is a flowchart illustrating a contents classification process of the contents management method of FIG. 2 according to exemplary embodiments of the present invention. FIG. 6A, FIG. 6B, FIG. 6C, FIG. 6D, and FIG. 6E are diagrams illustrating steps of the content classification process of FIG. 5.

Figure 6B:
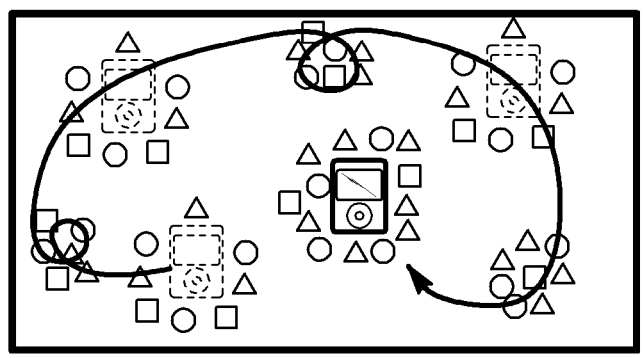

Referring to FIG. 5, FIG. 6A, FIG. 6B, FIB. 6C, FIG. 6D, and FIG. 6E, after displaying the icons of the digital devices connected to the MDS 100 and the contents stored in the digital devices on the display panel at step 207 of FIG. 2, the MDS 100 may monitor the touch screen 140 to detect a command input. If a command is detected, the MDS 100 may determine whether the command is a selection command for selecting a digital device (or a digital device icon) (S321). If the contents classification process is performed with a digital device, the MDS 100 may include a means for recognizing the contact of the digital device. The contents classification process may also be performed using digital device icons corresponding to the digital devices connected to the MDS 100. If the detected command is not the device selection command, the MDS 100 may execute a function corresponding to the detected command (S327). If the command is a selection command for selecting a digital device, the MDS 100 may set the keywords including device type and supportable file formats of the selected digital device (S322). For example, when the digital device selected by means of the digital device icon is an MP3 player, the MDS 100 may set the keywords indicating the file formats such as mp3, ogg, and way for classifying the audio contents. The MDS 100 can refer to the most recently played music file history log and set the genres (e.g. jazz and rock) of the most recently played as the keywords. The MDS may then detect a drag of the selected digital device icon as shown in the screen image 423 of FIG. 6A (S323). Although the digital device icon is depicted to be dragged to a center of the screen image 423 in FIG. 6A, exemplary embodiments of the present invention are not limited thereto. For example, the drag direction can be changed according to the user's preference/selection.

In FIG. 5, in some cases, steps S322 and S323 may occur in reverse chronological order. That is, the step for setting the keywords can follow the step of detecting the drag of a digital device icon.

If a specific digital device icon is dragged, the MDS 100 may classify and filter the contents by using the keywords set in association of the metadata such as device types and supportable file formats, and may display the classified or filtered contents (S325). The classified contents are then displayed in the form of GUI objects around the digital device icon as shown in the screen image 425 of FIG. 6A. The MDS 100 may then arrange the contents of which priorities are high closer to the digital device icon. In some cases, when a specific content among the classified contents is dragged in a direction (e.g., outward relative to the contents management application screen), the MDS 100 may check the file format of the dragged content and may filter the contents having the checked file format. For instance, when the file format of the dragged content is mp3, the MDS 100 may filter the contents having the mp3 file formats. Although a file format-based filtering is described, exemplary embodiments of the present invention are not limited thereto. For instance, the MDS 100 can select one of the attributes (such as file type, file name, artist, and creation data) included in the metadata, and may filter the contents having the same value of the selected attribute.

In some cases in which the digital device or digital device icon is dragged in a direction (e.g., outward relative to the contents management application screen), the MDS 100 may change the keywords, and may classify the contents again according to the new keywords. For instance, if the keywords set by dragging an MP3 player icon to the center of the contents management application screen are "mp3," "ogg," and "way," and the MP3 player icon is dragged again in outward direction, the MDS 100 may change the keywords to "wma" and "mid," and may classify the contents again by keyword.

Although the MDS 100 has been described above to determine the keywords related to device type and supportable file formats when a digital device icon is selected, exemplary embodiments of the present invention are not limited thereto. For instance, the keywords can be set by the user using a search object, which allows the user to enter and to save the keywords. The search object can be implemented in the form of a physical object, such as, for example, a peripheral accessory of the MDS 100, as shown in FIG. 6C, or a GUI object displayed on the touch screen 140, as shown in FIG. 6B.

Figure 6C:
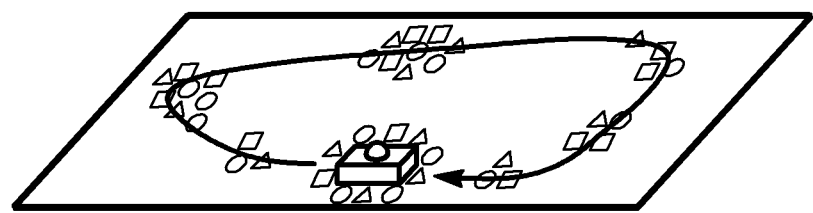

If the user moves the search object set with the keywords, within the contents management application screen as shown in FIG. 6B and FIG. 6C, the MDS 100 may search the metadata of the contents for the keywords, and may display the contents having the keywords as stuck to the search object. If the search object is the physical object, the MDS 100 can be configured to recognize the contact of the physical object on the touch screen 140, and may receive the keywords set in the physical object.

After classifying the contents by using the keywords, if the search object is wagged (i.e., moved up and down or side to side) by the user, the MDS 100 may separate the contents 410 having relatively low priorities from the search object as shown in FIG. 6D. The priorities of the contents can be determined based on the usage frequency or as set by the user. The number of contents separated from the search object can be set according to the speed of wagging behavior. That is, the faster the search object is wagged, the more the contents having relatively low priorities may be separated.

If the contents stuck to the search object are dragged and dropped onto an area where the contents are stored in a specific digital device or the corresponding digital device icon, the MDS 100 may upload the contents to the corresponding digital device. The MDS 100 may arrange the contents stored in the respective digital devices at different areas that may be distinguished from one other, as shown in FIG. 6E.

Figure 7:
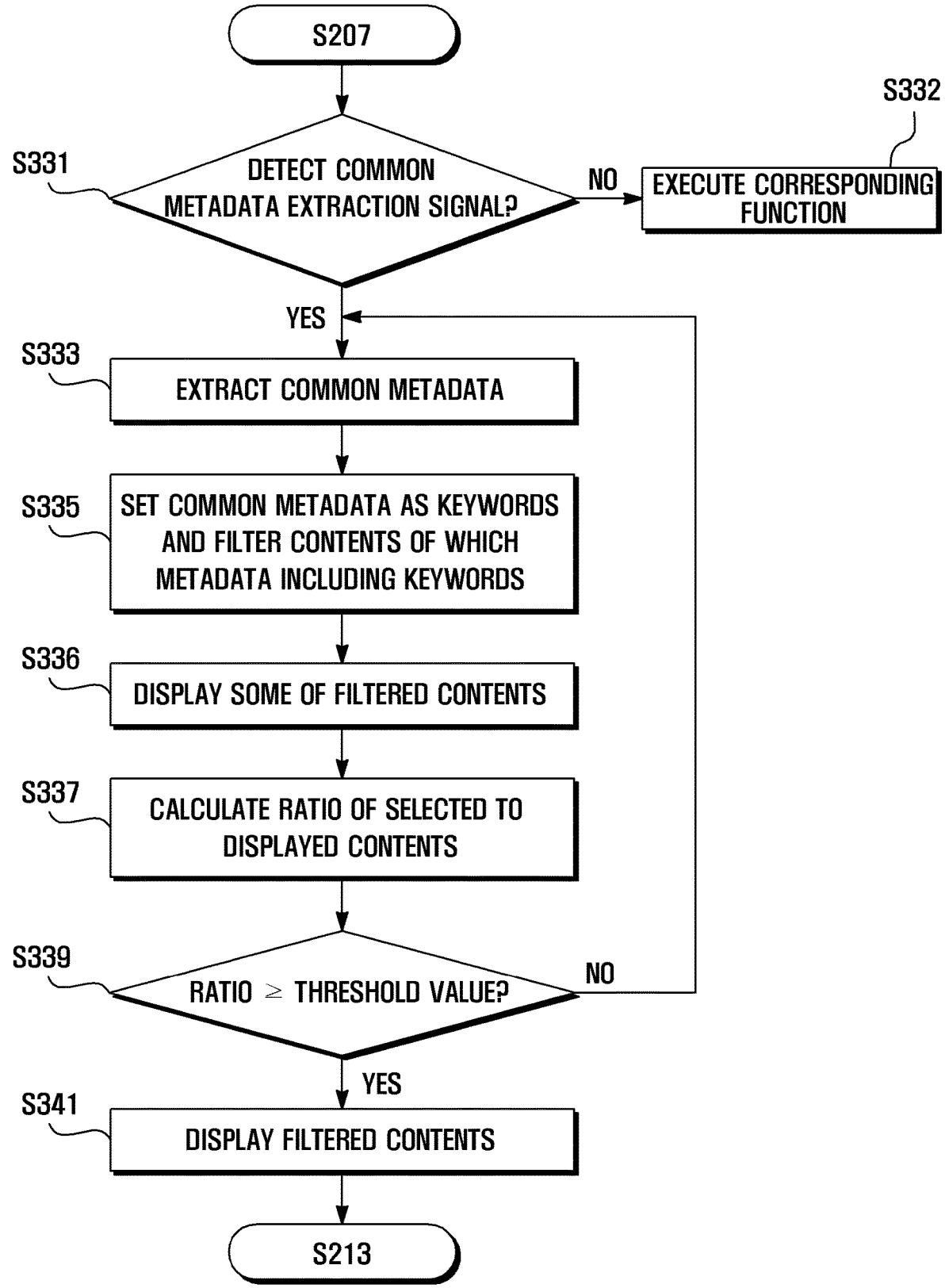
FIG. 7 is a flowchart illustrating a contents classification process of the contents management method of FIG. 2 according to exemplary embodiments of the present invention.

FIG. 7 is a flowchart illustrating a contents classification process of the contents management method of FIG. 2 according to exemplary embodiments of the present invention. FIG. 8A, FIG. 8B, FIG. 8C, and FIG. 8D are diagrams illustrating the steps of the content classification process of FIG. 7.

Figure 8D:
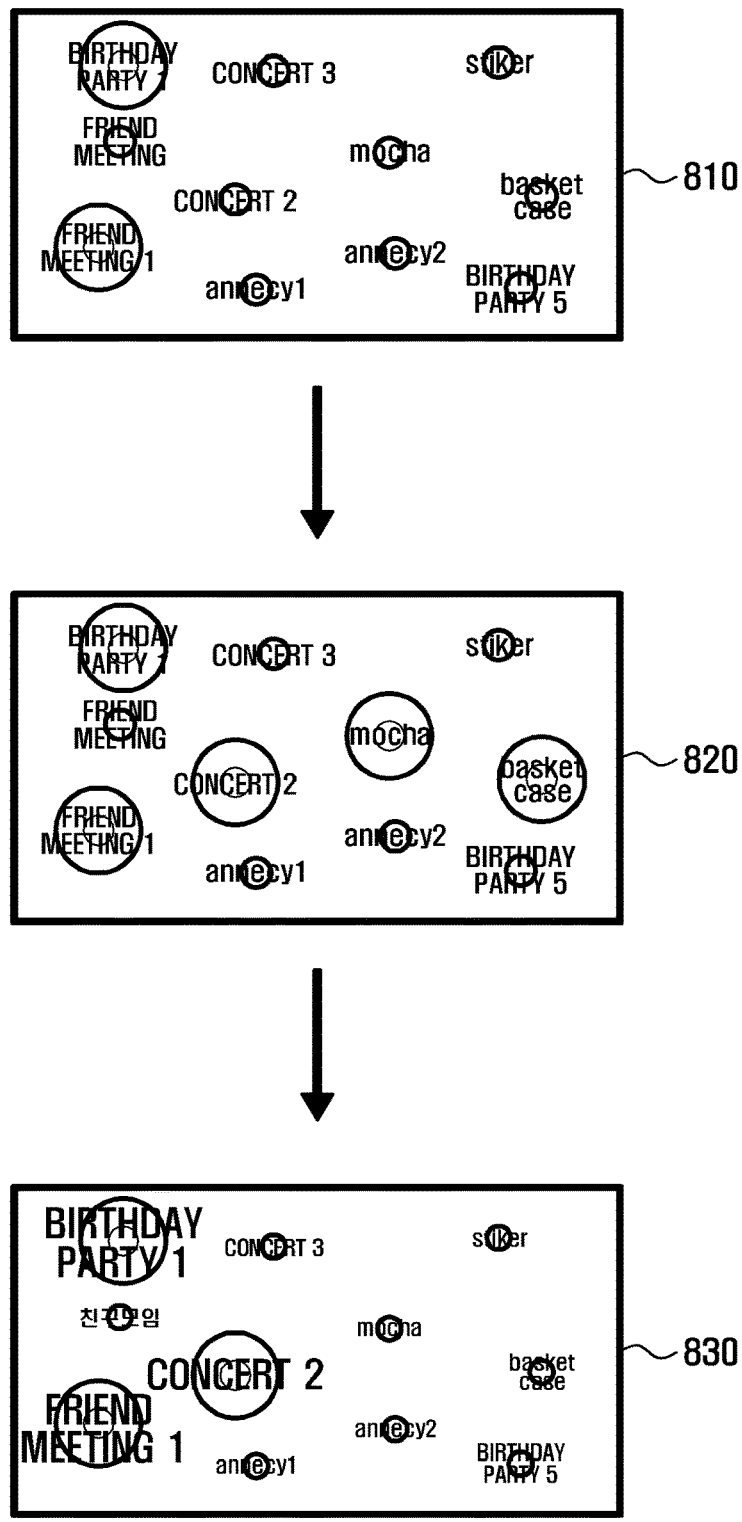

Referring to FIG. 7, FIG. 8A, FIG. 8B, FIG. 8C, and FIG. 8D, after displaying the icons of the digital devices connected to the MDS 100 and the contents stored in the digital devices on the display panel at step 207 of FIG. 2, the MDS 100 may monitor the touch screen 140 to detect a command input. If an input command is detected, the MDS 100 may determine whether the command is a common metadata extraction command for extracting a metadata shared in common by the contents stored in the connected digital devices (S331). The common data extraction command can be generated by a predetermined function key, execution of a menu, and/or a touch at a predetermined region of the touch screen 140. If the detected command is not the common data extraction command, the MDS 100 may execute a function corresponding to the detected command (S332). For instance, the MDS 100 can upload the selected data to a digital device in response to a contents upload command. If the detected command is the common data extraction command, the MDS 100 may check the metadata of the contents and may extract the metadata shared in common by the contents (S333). Referring to FIG. 8A, four contents, i.e., "clazziquai's" "Do You Like Spring Bear?," "Romeo and Juliet," and "Habit," are selected from a contents list. The content "clazziquai's $3^{rd}$" has the metadata including "music," "artist," "album," and "electronica;" the content "Do You Like Spring Bear?" has the metadata including "music," "rollercoaster," and "electronica"; the content "Romeo and Juliet" has the metadata including "music," "clazziquai's $3^{rd}$," and "electronica;" and the content "habit" has the metadata including "music,", "rollercoaster," and "electronica." The selected contents may share the metadata "music" 501 and "electronica" 503 in common. Although the metadata 500 are displayed in FIG. 8A, the MDS 100 can be configured to display the contents list on the display screen without explicit display of metadata.

After extracting the common metadata (e.g., music and electronica), the MDS 100 may set the common metadata as the keywords, filter the contents having metadata containing the keywords, and may classify the contents by using the common keywords (S335). The keywords can include the common metadata added when a ratio of a number of the selected contents to the displayed contents is less than a predetermined threshold value (e.g., 50%) at step S339 described later.

After classifying the contents by using the common keywords, the MDS 100 may display some of the filtered contents (S336). That is, the MDS 100 may select and display some of the contents filtered with the common keywords, as shown in FIG. 8B. In FIG. 8B, the contents "rollercoaster OST" and "wonderwoman" that are not displayed in FIG. 8A are displayed in addition to "clazziquai's 3$^{rd}$," "Do You Like Spring Bear?," "Romeo and Juliet," and "Habit" displayed in FIG. 8A.

If at least one of the displayed contents is selected by the user, the MDS 100 may calculate a ratio of the number of selected contents to the displayed contents (S337). For instance, if 5 contents are selected among the 6 displayed contents as shown in FIG. 8B, the ratio of the selected contents to the displayed contents is 83%. After calculating the selected-to-displayed contents ratio of the contents, the MDS 100 may compare the selected-to-displayed contents ratio with a predetermined threshold value (S339). The threshold value can be set by the user or manufacturing designer. If the selected-to-displayed contents ratio is equal to or greater than the threshold value, the MDS 100 may display the contents filtered by using the command keywords (S341), and may continue to step S213 of FIG. 2. If the selected-to-displayed contents ratio is less than the threshold value, the process may return to step S333. Since the common metadata are changed due to the change of the contents selected by the user, the keywords may also be changed. For example, since the MDS 100 may extract the common metadata of the contents selected by the user among the contents sharing the metadata "music" and "electronica," new common metadata can be added as a keyword in addition to the previously set keywords "music" and "electronica." For instance, as shown in FIG. 8C, if the contents "Do You Like Spring Bear?" and "habit" have been selected among the filtered contents, the common metadata "rollercoaster" 504 can be added as a new keyword. This keyword update process can be repeated until a process termination command is input by the user. If no further common data can be added as the keyword in addition to the previously set keywords "music" and "electronica," the MDS 100 may display a popup window indicating that no additional keyword may be updated such that the user can select contents again or that the contents filtering may be canceled.

If the contents are displayed in the form of GUI objects (e.g., particles, icons), the MDS 100 may display the particles or icons representing the contents in a scaled up manner to give a floating-up effect. Particles or icons representing the rest of the contents may be scaled down to give a sink-down effect. For instance, if the user selects the contents "birthday party 1" and "friend meeting 1" in an application screen as shown in the screen image 810 of FIG. 8D, the MDS 100 may extract common metadata of the selected contents, may set the common metadata as the keywords, and may display the contents "birthday party 1," "friend meeting 1," "concert 2," "mocha," and "basket case," each having metadata containing the keywords, in enlarged form as shown in the screen image 820 of FIG. 8D. Next, if the user reselects the contents "birthday part 1" and "friend meeting 1" among the contents enlarged in the screen image 820, the MDS 100 may calculate a selected-to-enlarged contents ratio, and may extract, if the selected-to-enlarged contents ratio is less than a predetermined threshold value, new common metadata. The MDS 100 may then update the keywords by adding the new common metadata, filter the contents having the metadata containing the updated keywords, and may display the contents "birth data 1," "friend meeting 1," and "concert 2" filtered by using the updated keywords in enlarged form as shown in screen image 830 of FIG. 8D. By displaying the contents in a three dimensional manner, the user can identify the filtered contents intuitively.

The keyword update process can be repeated until the filtering result is satisfactory to the user, and the MDS 100 may store the keywords within the storage unit 120 after the contents filtering are complete.

Figure 9:
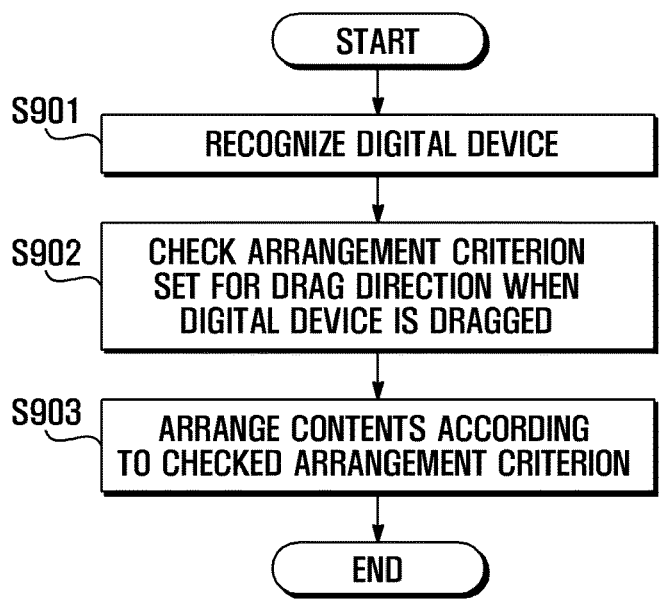
FIG. 9 is a flowchart illustrating a contents classification process of the contents management method of FIG. 2 according to exemplary embodiments of the present invention.

FIG. 9 is a flowchart illustrating a contents classification process of the contents management method of FIG. 2 according to exemplary embodiments of the present invention. FIG. 10A, FIG. 10B, FIG. 10C, FIG. 10D, FIG. 10E, and FIG. 10F are diagrams illustrating steps of the contents classification process of FIG. 9.

Figure 10A:
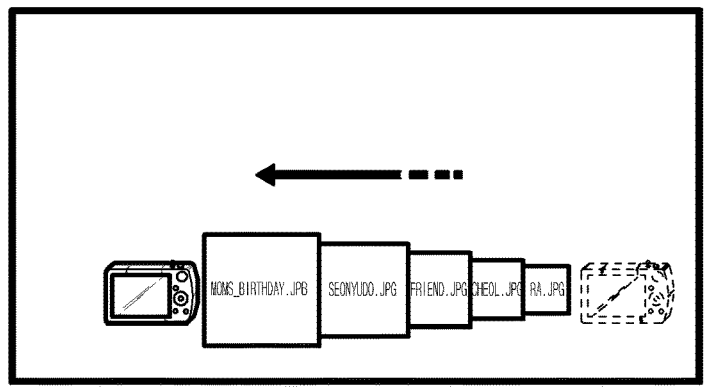
FIGS. 10A, 10B, 10C, 10D, 10E and 10F are diagrams illustrating steps of the contents classification process of FIG. 9 according to exemplary embodiments of the present invention.
Figure 10B:
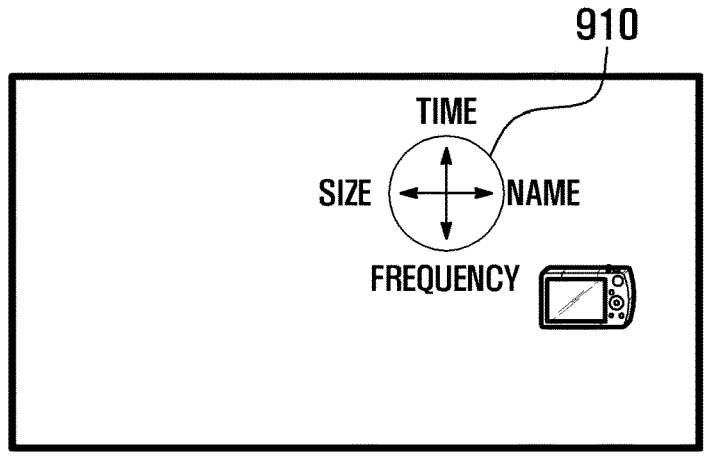
Figure 10C:
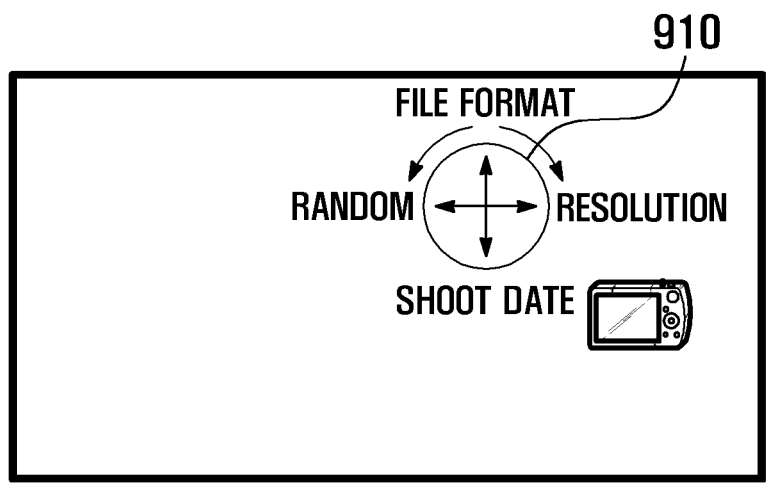

Referring to FIG. 9, FIG. 10A, FIG. 10B, FIG. 10C, FIG. 10D, FIG. 10E, and FIG. 10F, when a digital device touches the touch screen 140, the MDS 100 may recognize the digital device (S901). Once the digital device is recognized, the MDS 100 may monitor the touch screen 140 to detect a drag of the digital device in a specific direction on the touch screen 140. If the digital device is dragged as shown in FIG. 10A, the MDS 100 may check an arrangement criterion set for the drag direction (S902). The arrangement criterion can be a time, size, frequency, name, file format, and/or resolution. Once the arrangement criterion is checked, the MDS 100 may arrange the contents stored in the digital device according to the arrangement criterion in the display panel (S903). Referring to FIG. 10B, if the digital device is dragged in a left direction, in some cases, the MDS 100 may check the metadata of the contents stored in the digital device, and may arrange the contents in order of sizes of the contents. If the digital device is dragged in a right direction, in some cases, the MDS 100 may arrange the contents stored in the digital device in alphabetical order of the names of the contents. To inform the user of the direction-specific arrangement criteria, the MDS 100 may display, when the digital device is detected on the touch screen 140, a guide object 910 indicating the direction-specific arrangement criteria as shown in FIG. 10B. The guide object 910 may show the arrangement criteria set for the respective directions together with the direction arrows. The guide object 910 can be configured to rotate clockwise and counterclockwise direction in response to a user's touch behavior such that the arrangement criteria can be changed according to a rotation of the guide object 910, as shown in FIG. 10C. For instance, the arrangement criteria "time," "size," frequency," and "name," as shown in FIG. 10B, may be replaced by the arrangement criteria "file format," "random," "creation date," and "resolution," as shown in FIG. 10C, according to the rotation of the guide object 910.

Although the contents arrangement process has been described with 4 drag directions, exemplary embodiments of the present invention are not limited thereto. For instance, the number of drag directions can be set in various manners according to the user or designer's preference/selection.

Figure 10D:
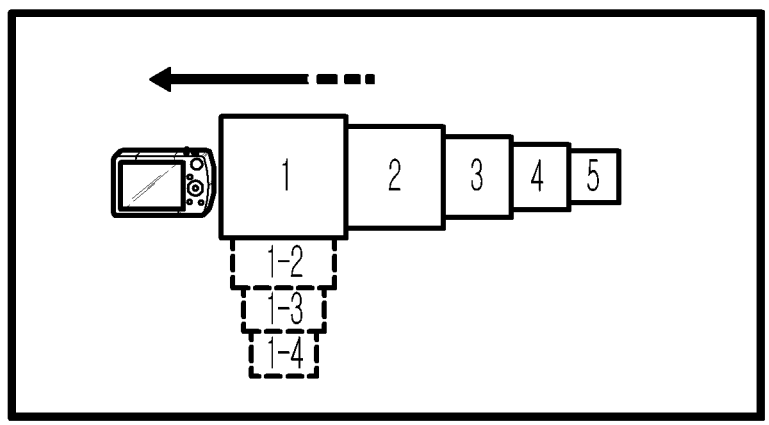

The MDS 100 can be configured such that the contents of which metadata (e.g., genre, artist, place, file name, shoot date) are similar to each other are arranged in an overlapped manner. For instance, contents having similar metadata can be displayed in an overlapped manner (e.g., vertically stacked) while contents are generally arranged horizontally in order of a criterion set for the left direction drag as shown in FIG. 10D. In FIG. 10D, the overlapped underlay contents may be indicated with a dotted box around the graphical representations of the contents. The underplayed contents of the overlapped contents are not shown on the display panel. To indicate the overlapped contents, in some cases, the content icon placed on top can be displayed with a different background color around it.

Figure 10E:
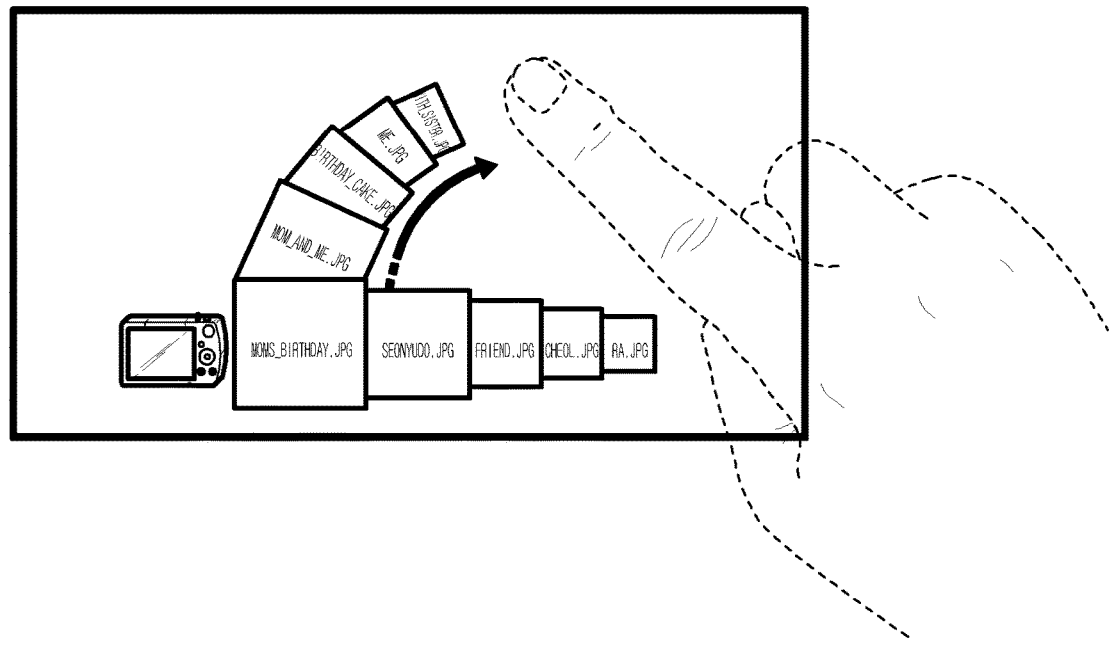
Figure 10F:
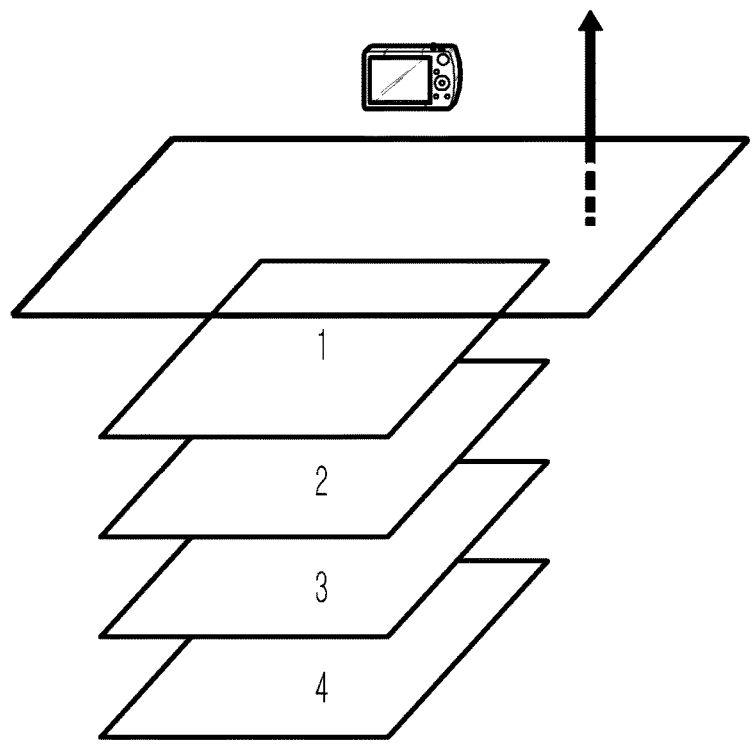

If a group (e.g. moms birthday.jpg) of contents overlapped according to metadata similarity is dragged in a specific direction, the MDS 100 may spread the overlapped contents in the drag direction to check all the contents (e.g., mom_and_me.jpg, birthday_cake.jpg, me.jpg, and with_my_sister.jpg), as shown in FIG. 10E.

Although the contents arrangement operations are described in association with the drags in left, right, up, and/or down directions, the contents can be arranged in response to the movement of the digital device from the touch screen 140 (i.e., the movements of approach to and retreat from the touch screen 140). For instance, when the digital device retreats from the touch screen 140 (FIG. 10F), the MDS 100 can be configured to display the contents grouped by metadata similarity in order of priority in response to the retreat of the digital device. In order to sense the movement of the digital device in depth, in some cases, the MDS 100 may be provided with a photo sensor and/or approach sensor.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A contents management method for a media management apparatus, the method comprising:
    displaying a first graphical user interface object representing an external device connected to the media management apparatus and second graphical user interface objects representing contents stored in the external device;
    receiving a selection of a graphical user interface object of the displayed first graphical user interface object and second graphical user interface objects;
    detecting a first input drag of the selected graphical user interface object;
    displaying a plurality of keyword regions, each of the plurality of keyword regions including a keyword associated with an attribute of the selected graphical user interface object;
    detecting a touch event associated with a first keyword region of the plurality of keyword regions; and
    filtering, in response to the touch event, the displayed first graphical user interface object and second graphical user interface objects based on the keyword included in the first keyword region.

2. The contents management method of claim 1, further comprising:
    displaying, in response to the filtering of the displayed first graphical user interface object and second graphical user interface objects, a filtered set of graphical user interface objects.

3. The contents management method of claim 2, further comprising:
    determining a strength of the touch event,
    wherein the filtered set of graphical user interface objects is filtered based on the strength of the touch event.

4. The contents management method of claim 1, wherein the attribute of the selected graphical user interface object comprises at least one of an external device type, one or more file formats associated with the external device, or one or more file formats associated with the contents stored in the external device.

5. The contents management method of claim 2, further comprising:
    detecting a second input drag of a graphical user interface object of the filtered set of graphical user interface objects;
    determining a direction of the second input drag; and
    filtering the filtered set of graphical user interface objects based on at least one attribute associated with the direction of the second input drag.

6. The contents management method of claim 2, further comprising:
    filtering, in response to a graphical user interface object of the filtered set of graphical user interface objects being dragged in a determined direction, the filtered set of graphical user interface objects based on a keyword associated with the determined direction.

7. The contents management method of claim 2, wherein the displaying of the filtered set of graphical user interface objects comprises:
    detecting a drag of a search object comprising a keyword to an area where the first graphical user interface object and second graphical user interface objects are displayed;
    checking metadata associated with the first graphical user interface object and second graphical user interface objects displayed in proximity to the search object; and
    sticking graphical user interface objects having metadata comprising the keyword to the search object.

8. The contents management method of claim 7, further comprising:
    detecting a wag of the search object; and
    separating, in response to detecting the wag of the search object, at least one of the stuck graphical user interface objects representing content of relatively lower priority among the graphical user interface objects stuck to the search object.

9. The contents management method of claim 1, further comprising:
    determining, in response to receiving a selection of a plurality of graphical user interface objects of the second graphical user interface objects, common metadata shared by the plurality of graphical user interface objects of the second graphical user interface objects; and
    filtering the displayed first graphical user interface object and second graphical user interface objects based on the common metadata.

10. The contents management method of claim 2, further comprising:
    detecting a second input drag of the external device on a touch screen of the media management apparatus;
    aligning, if the second input drag is in a first direction, the displayed second graphical user interface objects in the first direction; and
    aligning, if the second input drag is in a second direction, the displayed second graphical user interface objects in an overlapped configuration.

11. The contents management method of claim 10, further comprising:
    displaying a guide object indicating a direction-specific arrangement criterion.

12. The contents management method of claim 11, further comprising:
    detecting a rotation of the guide object; and
    changing the direction-specific arrangement criterion based on a direction of the rotation.

13. The contents management method of claim 10, wherein the aligning of the displayed second graphical user interface objects in the first direction comprises:
    overlapping and displaying the displayed second graphical user interface objects based on at least one of a genre, an artist, a place, a file name, or a date stored.

14. The contents management method of claim 1, wherein the displaying of the first graphical user interface object representing the external device connected to the media management apparatus and the second graphical user interface objects representing contents stored in the external device comprises:
    displaying the first graphical user interface object and second graphical user interface objects in a distinct color, the distinct color being designated according to the external device.

15. A contents management apparatus, comprising:
    an interface unit configured to connect to at least one external device;
    a touch screen configured to display a first graphical user interface object representing an external device connected to the contents management apparatus and second graphical user interface objects representing contents stored in the external device; and
    a processor configured to:
        receive a selection of graphical user interface object of the displayed first graphical user interface object and second graphical user interface objects,
        detect a first input drag of the selected graphical user interface object,
        display a plurality of keyword regions, each of the plurality of keyword regions including a keyword associated with an attribute of the selected graphical user interface object,
        detect a touch event associated with a first keyword region of the plurality of keyword regions, and
        filter, in response to the touch event, the displayed first graphical user interface object and second graphical user interface objects based on the keyword included in the first keyword region.

16. The contents management apparatus of claim 15, wherein the touch screen is further configured to:
    display a filtered set of graphical user interface objects.

17. The contents management apparatus of claim 16, wherein the processor is further configured to determine a strength of the touch event, and
    wherein the filtered set of graphical user interface objects is filtered based on the strength of the touch event.

18. The contents management apparatus of claim 15, wherein the attribute of the selected graphical user interface object comprises at least one of an external device type, one or more file formats associated with the external device, or one or more file formats associated with the contents stored in the external device.

19. The contents management apparatus of claim 15, wherein the processor is further configured to:
    cause the touch screen to display a filtered set of the first graphical user interface object and second graphical user interface objects,
    receive information corresponding to a second input drag of a graphical user interface object of the filtered set of the first graphical user interface object and second graphical user interface objects,
    determine a direction of the second input drag based on the information, and
    filter the filtered set of the first graphical user interface object and second graphical user interface objects based on at least one attribute associated with the second input drag direction.

\* \* \* \* \*